United States Patent [19]
Chapin, Jr.

[11] Patent Number: 6,138,917
[45] Date of Patent: *Oct. 31, 2000

[54] MULTIPLE MAGNETIC STRIPE TRANSACTION CARDS AND SYSTEMS FOR THE UTILIZATION THEREOF

[75] Inventor: Stephen R. Chapin, Jr., Ellicott City, Md.

[73] Assignee: International Card Technology, Ellicott City, Md.

[ * ] Notice: This patent is subject to a terminal disclaimer.

[21] Appl. No.: 09/081,676

[22] Filed: May 20, 1998

Related U.S. Application Data

[63] Continuation-in-part of application No. 08/906,908, Aug. 6, 1997, Pat. No. 5,984,191, which is a continuation-in-part of application No. 08/743,429, Nov. 1, 1996, abandoned, which is a continuation-in-part of application No. 08/560,585, Nov. 20, 1995, Pat. No. 5,883,377.
[60] Provisional application No. 60/004,665, Oct. 2, 1995.
[51] Int. Cl.[7] .................................................. G06K 19/00
[52] U.S. Cl. ........................................... 235/487; 235/449
[58] Field of Search .................................... 235/380, 493, 235/449, 487, 448, 375; 283/904, 107, 108, 114

[56] References Cited

U.S. PATENT DOCUMENTS

| | | |
|---|---|---|
| 4,262,589 | 4/1981 | Gebhardt . |
| 4,507,550 | 3/1985 | Fleer ........................................ 235/449 |
| 4,609,812 | 9/1986 | Drexler .................................... 235/487 |
| 4,806,740 | 2/1989 | Gold et al. .............................. 235/449 |
| 5,326,964 | 7/1994 | Risser ..................................... 235/487 |
| 5,506,395 | 4/1996 | Eppley .................................... 235/486 |
| 5,883,377 | 3/1999 | Chapin, Jr. ............................. 235/493 |

Primary Examiner—Karl D. Frech
Attorney, Agent, or Firm—Millen, White, Zelano & Branigan

[57] ABSTRACT

A transaction card includes at least two read-only magnetically encoded stripes encoding different data in accordance with standard data encryption protocols readable by conventional transaction card reading systems. The stripes are associated with areas of the card which may have different indicia, such as, for example, being different colors or different textures. In accordance with one embodiment, superimposed upon the card may be two sets of printed indicia including, for example, the transaction card number, the expiration date and the name of the card user. One set of the printed indicia is inverted with respect to the other set so as to indicate to the user which one of the magnetic stripes is being processed. In this way, magnetically encoded information on the same transaction card may be segregated at the point of sale. The transaction card is readable by standard, existing readers and the information is processed for invoicing by standard processing systems to preferably generate a single statement with two groups of charges, one relating to each magnetically encoded stripe.

57 Claims, 8 Drawing Sheets

MULTIPLE MAGNETIC STRIPE TRANSACTION CARDS AND SYSTEMS FOR THE UTILIZATION THEREOF

RELATED PATENT APPLICATIONS

This application claims priority under 35 U.S.C. 119 for U.S. Provisional application Ser. No. 60/004,665, filed Oct. 02, 1995; which is a continuation-in-part of U.S. Patent application Ser. No. 08/906,908, filed Aug. 6, 1997 now U.S. Patent No. 5,984,191, issued Nov. 16, 1999; which is a continuation-in-part of U.S. Patent application Ser. No. 08/743,429, filed Nov. 1, 1996 now abandoned; which is a continuation-in-part of U.S. Patent application No. 08/560,585, filed Nov. 20, 1995 now U.S. Patent No. 5,883,377, issued Mar. 16, 1999.

FIELD OF THE INVENTION

The present invention relates to multiple magnetic stripe transaction cards and systems for the use thereof. More particularly, the present invention relates to magnetic stripe transaction cards usable with currency installed conventional reading and processing systems.

BACKGROUND OF THE INVENTION

Currently, all transactions made utilizing a transaction card with one magnetic stripe must be charged against one information set contained on that magnetic stripe. Examples of such cards are conventional credit cards, ATM cards and frequent flyer cards. For non-magnetic stripe readers, transactions are charged against one set of raised account numbers. Presently, single cards do not have multiple account capability so as to be separable into different accounts or categories at points of sale. Moreover, as transaction cards multiply, so do difficulties such as the physical inconvenience of carrying the cards, the difficulties in consolidating rebates from multiple accounts, and the inconveniences of receiving more than one bill and writing more than one check. In addition, there is frequently a need to separate transactions for specific categories of business expenses and for appropriate record keeping. This is especially the case for small business owners who need to separate transactions for accounting purposes and employees who must separate transactions for reimbursement purposes. There is also a need to have a choice of payment methods (payoff at month's end, revolving, fixed installment method, etc.) at the point of sale on one card. Finally, choosing who pays for each of the multiple accounts on one card is a desirable feature. For example, students may charge basic school supplies for parent reimbursement on one account and non-school expenses for personal payment on the other.

The current credit cards with one magnetic stripe cannot separate transactions at the point of sale. To configure them to do so requires advanced technologies such as "smart" cards which require complete reconfiguration of merchant reader equipment and which, in addition to requiring a complete change-out of the installed processing base, would require retraining of all merchant users. Introduction of advanced technologies to separate transactions at the point of sale would result in installation of unproven systems which may be susceptible to fraud as well as installation of systems requiring modification of strict VISA/MasterCard standards. Moreover, extensive research and development and extensive investment in tooling for manufacturing would be necessary to implement using advanced technologies for separating transactions at the point of sale.

SUMMARY OF THE INVENTION

It is an object of this invention to provide a new and improved transaction card having at least first and second read-only data stripes thereon.

In accordance with this object and other objects, a transaction card of standard dimensions comprises a substrate having one side with first and second areas. A first read-only coded magnetic stripe is disposed in the first area and a second read-only coded magnetic stripe is disposed in the second area. The first and second stripes may encode different data in accordance with standard data encryption protocols, readable by conventional retail, transaction card reading systems. The other side includes printed indicia identifying a customer and numerical indicia identifying that customer's account number, and perhaps other account information (e.g., expiration date) as is standard in the credit card industry.

In accordance with a further aspect of the invention, the invention is directed to a system including transaction cards readable by standard transaction card readers, the standard retail transaction card readers themselves and central information processors connected to the readers. Each transaction card includes a substrate having first and second areas with different visual and/or tactile indicia. A first read-only data strip is disposed in the first area and a second read-only data strip is disposed in the second area. The first and second data stripes encode different data (or the same data) in accordance with standard data encryption protocols, readable by the standard transaction card readers. The standard card readers are connected to a central processor which includes at least one invoice-generating processor. The invoice-generating processor has a dual output for each transaction card with the dual output having first output data related to the data encoded on the first magnetic stripe and second output data relating to data encoded on the second magnetic stripe.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
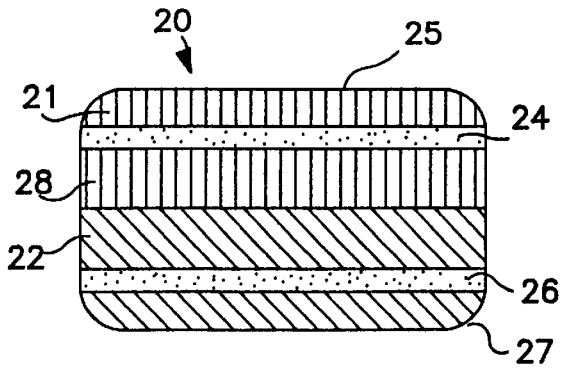
FIG. 1 is a rear, planar view of a first embodiment of a transaction card configured in accordance with the principles of the present invention.

Referring now to FIGS. 1–6, there is shown in a first embodiment, a transaction card 20, comprising a substrate having the approximate length, width and thickness of a standard VISA/MasterCard/ American Express/ Discover credit card. FIG. 1 illustrates the rear view of the transaction card 20 wherein the transaction card has a first area 21 and a second area 22. The second area 22 is preferably visually distinctive from the first area 21. For example, as illustrated by the diagonal shading, the second area 22 may be green in color and the first area 21 may be brown in color, whether different colors are used and the particular color selected by the vendor of the credit card is optional and it is only important that, when used, the user be able to visually distinguish the first area 21 from the second area 22. The first area 21 may also optionally have a different tactile feel from the second area 22. Again, it is only important that, when used, the first area 21 be distinguishable from the second area 22.

The first area 21 has a first magnetic stripe 24 adhered thereto in accordance with standard transaction card dimensions. In other words, the first magnetic stripe 24 is preferably disposed approximately ⅜ inch from the edge 25 of the transaction card 20. In accordance with the present invention, the first magnetic stripe 24 is encrypted with standard read-only data that the usual customer transaction card is encrypted with, i.e., data that may be read by a merchant swipe reader, an ATM-like reader or an older imprint-type reader. An example of the read-only encoded data on the stripe 24 is data identifying the card user and the category of the account to be charged upon using the transaction card 20.

Disposed in the second area 22 is a second magnetic stripe 26 which is preferably positioned ⅜ inch from the edge 27 of the transaction card 20 in accordance with standard transaction card requirements. The second magnetic stripe 26 can be encrypted with data different from the data of the first magnetic stripe 24 so that when the card 20 is used, separation of transactions at the point of sale may be accomplished (e.g., stripe may identify a separate account). For example, the first stripe 24 may be for business expenses and the second stripe 26 for personal expenditures, or the first stripe 24 may be for necessities and the second stripe 26 for luxuries.

Figure 2:
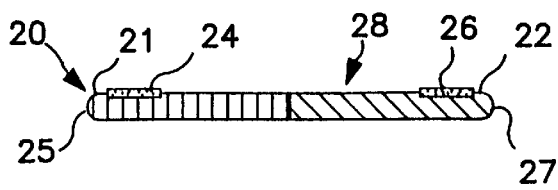
FIG. 2 is an end view of the transaction card of FIG. 1.

Referring now to FIG. 2, it is seen that the first and second magnetic stripes 22 and 26 are on the same surface 28, i.e., the rear surface of the transaction card 20.

Figure 3:
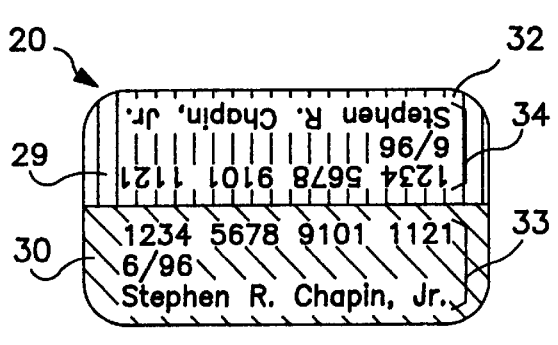
FIG. 3 is a front view of the transaction card of FIGS. 1 and 2.

In FIG. 3, the front surface 29 of the transaction card 20 is shown. In accordance with the illustrated embodiment, the front surface 29 is divided into third and fourth areas 32 and 30 which preferably has different visual or tactile indicia. Preferably, the third area 32 is the same color or texture as the first area 21 and the fourth area 30 is of the same visual or tactile indicia as the second area 22 on the rear side 28 of the transaction card 20. The front side 29 of the transaction card 20 has a first set of printed indicia 33 and a second set of printed indicia 34 which is inverted with respect to the printed indicia 33 so as to inform the person using the card as to which of the magnetic stripes 24 and 26 is being read. Printed indicia may or may not contain user's account number; if, account number is used, it may be identical or different. As is seen in FIG. 3, since the printed indicia 33 in the green third area 30 is oriented right side up for reading, it is known to the user and to the merchant that the magnetic stripe 26 in the green area 22 is being read.

Figure 4:
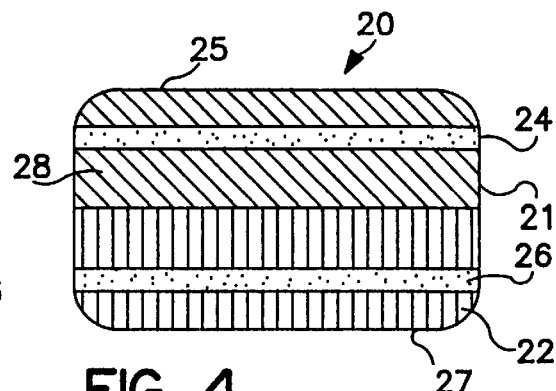
FIG. 4 is a rear view of the transaction card in accordance with the first embodiment of the present invention of FIGS. 1–3, but shown inverted.
Figure 5:
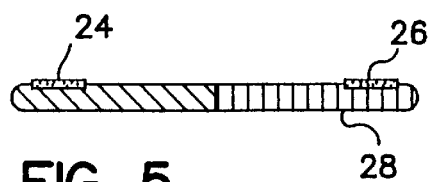
FIG. 5 is an end view of the transaction card as shown in FIG. 4.
Figure 6:
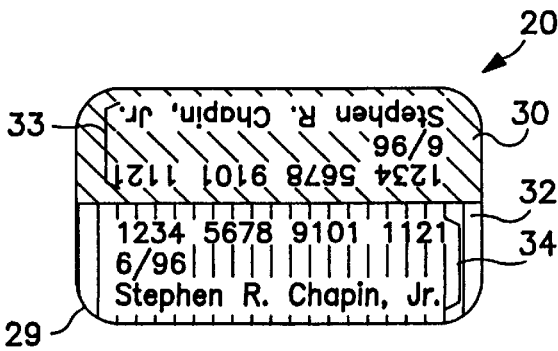
FIG. 6 is a front view of the transaction card of FIGS. 4 and 5 shown inverted from the FIG. 3 orientation.

Referring now to FIGS. 4–6, the orientation of the transaction card 20 is reversed so that the printed indicia 33 is inverted and the printed indicia 34 is oriented for reading. This informs the user and merchant that the transaction card 20 is oriented so that the first stripe 24 rather than the second stripe 26 is positioned for reading by the transaction card reader.

Figure 7:
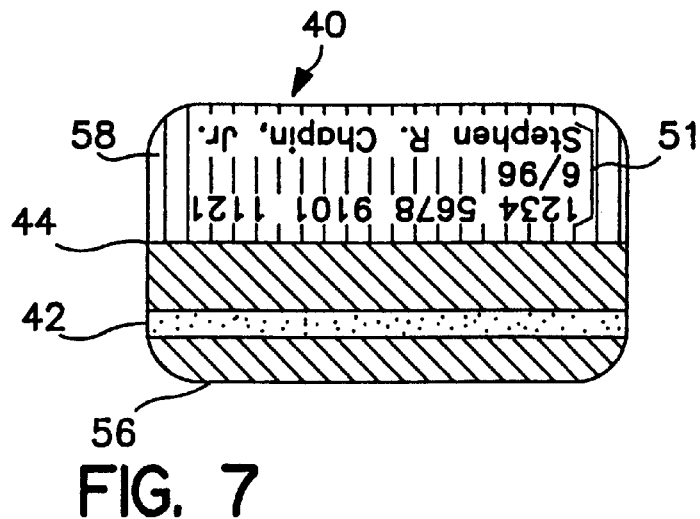
FIG. 7 is a planar view of a first side of a second embodiment of a transaction card configured in accordance with the principles of the present invention.
Figure 8:
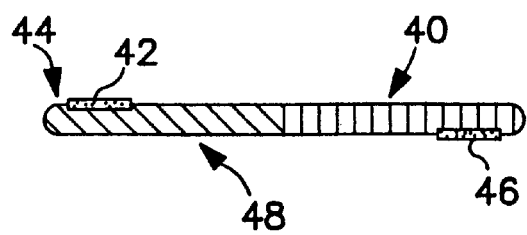
FIG. 8 is an end view of the transaction card of FIG. 7.
Figure 9:
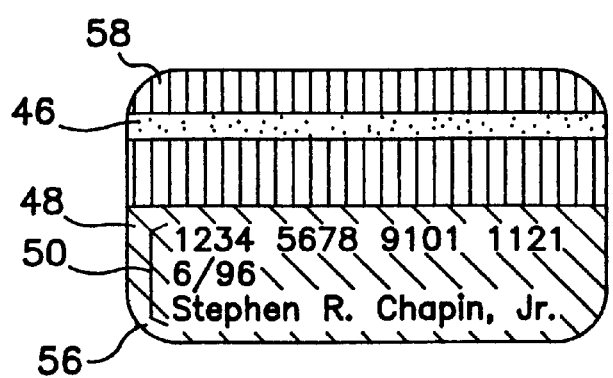
FIG. 9 is a planar view of the second side of the transaction card of FIGS. 7 and 8.

Referring now to FIGS. 7–9, a second embodiment 40 of the transaction card in accordance with the present invention is illustrated wherein a first magnetic stripe 42 is disposed on a first side 44 of the transaction card 40 and a second magnetic stripe 46 disposed on a second side 48 of the transaction card. As with the first embodiment, the stripes 42 and 46 preferably have encrypted thereon different read-only data identifying different accounts or categories of accounts to be charged. With this arrangement, printed indicia 50 on the second side 48 of the transaction card 40 relates to the first magnetic stripe 42, and printed indicia 51 on the first side 44 of the transaction card 40 relates to the second magnetic stripe 46. In other words, when the printed indicia 50 appears to the person processing the card right side up (FIG. 9), then the first magnetic stripe 42 is being read and, when the printed indicia 51 appears right side up, then the second magnetic stripe 46 is being read. While indicia 50/51 have identical account numbers, they may also be different.

As with the first embodiment, first and second background colors 56 and 58 are preferably used with the card 40. The first color 56 links first stripe 42 to printed indicia 50 and the second color 58 links the second stripe 46 to the printed indicia 51. Any or no colors may be used and it is only important that the two lines of data encrypted on stripes 42 and 46 on the card 40 be visually distinguishable. This also may be accomplished by words such as using the term "BUSINESS" on side 44 of the card and the term "PERSONAL" on the second side 48 or by using a different tactile feel. In a modification of the second embodiment, the first side 44 of the transaction card 40 may be of entirely one color and the second side 48 be of another color.

It is also within the scope of this invention to have transaction cards (not shown) that include read-only magnetic strips extending perpendicular to the direction of the magnetic stripes 24 and 26 of the transaction card 20 and perpendicular to the magnetic stripes 42 and 46 of the transaction card 40 so as to provide additional read-only data for various purposes. These magnetic stripes may be in lieu of or in addition to the magnetic stripes of transaction cards 20 and 40 and may be on the same or opposite sides of the transaction cards.

Figure 10:
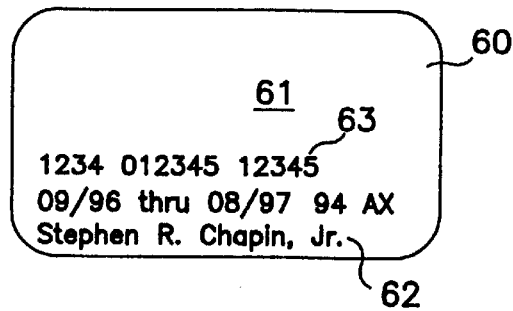
FIG. 10 is a front, planar view of a third embodiment of a transaction card configured in accordance with the principles of the present invention.
Figure 11:
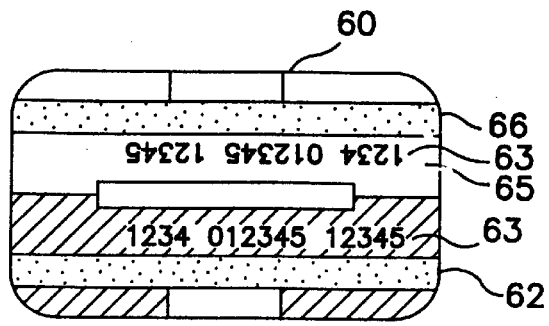
FIG. 11 is a rear, planar view of the transaction card of FIG. 10.
Figure 14:
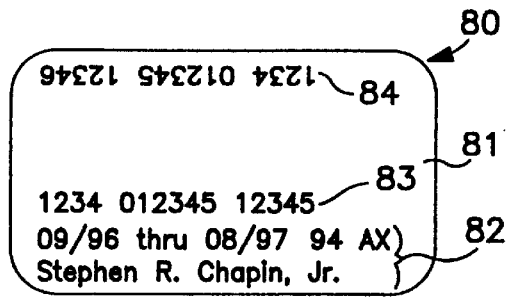
FIG. 14 is a front, planar view of a fifth embodiment of a transaction card configured in accordance with the principles of the present invention.

Referring now to FIGS. 10 and 11, a third embodiment of the present invention is disclosed wherein a transaction card 60 has a front face 61 which includes indicia 62 such as that identifying the transaction card customer and the expiration date and indicia 63 which is the transaction card account number. As is seen in FIG. 14, on the rear face 65 of the transaction card, there are two magnetic stripes 66 and 67. Magnetic stripes 66 and 67 both correspond to the account number on the front of the card. When the transaction card 60 is used at the point of sale, an identifier, in addition to the account number data on the magnetic stripe, is used to assign trans actions to different categories represented by each stripe after the magnetic stripe is used at the point of sale.

Figure 12:
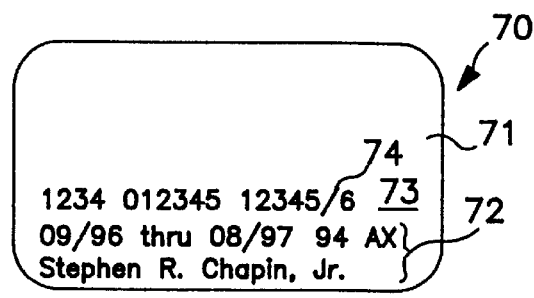
FIG. 12 is a front, planar view of a fourth embodiment of a transaction card configured in accordance with the principles of the present invention.
Figure 13:
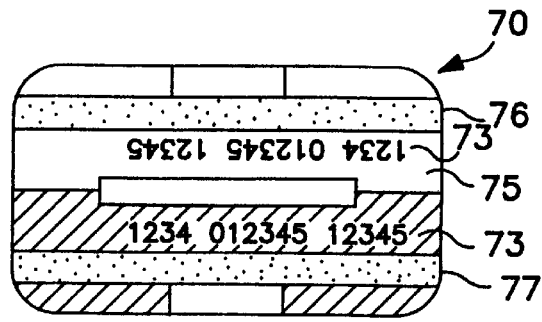
FIG. 13 is a rear, planar view of the transaction card of FIG. 12.

Referring now to FIGS. 12 and 13 where a fourth embodiment of the invention is shown, a transaction card 70 has a front face 71 with indicia 72 thereon identifying the customer and account number indicia 73 thereon which differs from the account number indicia 63 of the transaction card 60. The indicia 73 includes in the account numbers "5" and "6" separated by a "slash" 74. Thus, the front face 71 of the transaction card 60 has in effect two account numbers in the account number indicia 73 which differ only in the final digit, resulting in one account number being a permutation of the other.

Referring now to FIG. 13, where the back face 75 of the transaction card 70 is shown, it is seen that the first magnetic stripe 76 is identified with the account number 73 having "5" as the last digit and a stripe 77 is identified by an account number 73' having a "6" as the final digit. Accounts currently, each of the two account numbers 73 and 73' corresponds to an appropriate magnetic stripe 76 and 77, respectfully. For transactions not using magnetic swiping, the appropriate final digit "5" or "6" is circled. In is to be understood, that the final digit can be any digits "0"–"9", the digits "5" and "6" merely being exemplary.

Figure 15:
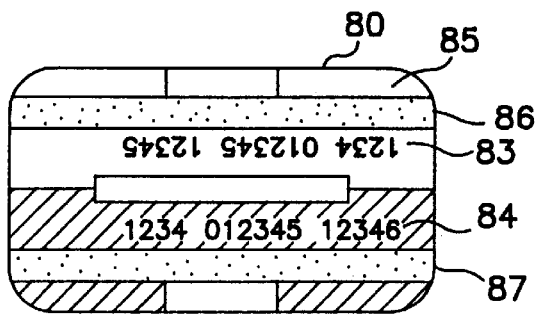
FIG. 15 is a rear, planar view of the transaction card of FIG. 14.

Referring now to FIGS. 14 and 15, there is shown a fifth embodiment of the invention, wherein a transaction card 80 has on a front face 81 thereof first indicia 82 identifying the customer; a first account number 83 associated with a first account for that customer and a second account number 74 is associated with a second account for that customer. The second account number 84 is inverted with respect to the first account number 83. On the rear side 85 of the card are magnetic stripes 86 and 87. The magnetic stripe 86 is associated with the account number 83 while the magnetic stripe 87 is associated with the account number 84. The transaction card 80 is inverted to swipe the magnetic stripe 86 from the orientation of FIG. 15 which is used to read the magnetic stripe 87. In non-magnetic stripe transactions, the transaction card 80 is inserted either upside down or right side up to select the appropriate account number. In either case, the embossed information will be correctly placed on the invoice slip.

Figure 16:
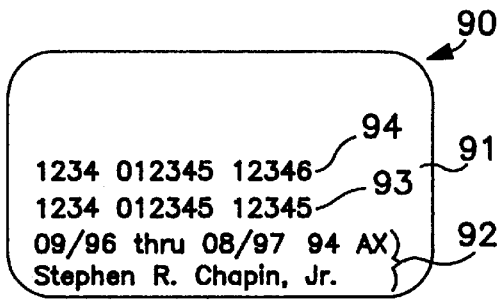
FIG. 16 is a front, planar view of a sixth embodiment of a transaction card configured in accordance with the principles of the present invention.
Figure 17:
FIG. 17 is a rear, planar view of the transaction card of FIG. 16.

Referring now to FIGS. 16 and 17, there is shown a sixth embodiment of the invention, wherein a transaction card 90 has a front face 91 with first indicia 92 identifying the customer, a first account number 93 and second account number 94, wherein the account numbers are both oriented the same as the customer indicia 92. As is seen in FIG. 17, the stripes 96 and 97 are associated with the account numbers 93 and 94, respectively. At the point of sale, the account number 93 or 94 actually used is circled when the point of sale use is a non-magnetic stripe use.

Figure 18:
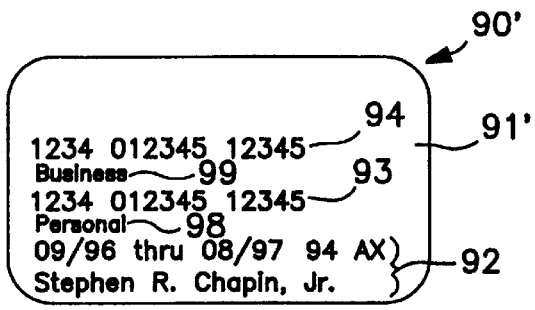
FIG. 18 is a front, planar view of a more specific transaction card configured in accordance with the principles of FIGS. 16 and 17.

In FIG. 18, a transaction card 90' has a front face 91' which is substantially similar to that of the transaction card 90 of FIG. 16, but with the addition of printed indicia 98 and 99 specifically identifying the purpose of the account numbers 93 and 94. For example, the front face of the printed indicia 99 is for "business" use, while the printed indicia 98 is for "personal" use.

Figure 19:
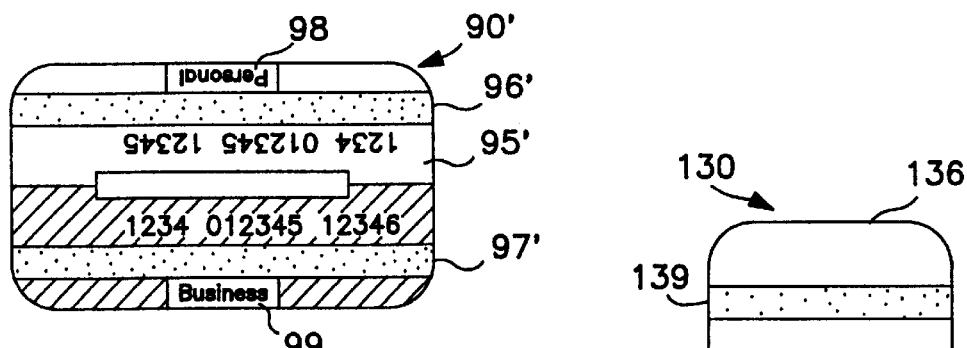
FIG. 19 is a rear, planar view of the transaction card of FIG. 18.

As is seen in FIG. 19, the written indicia 98 and 99 also appears on the back face 95' of the card identifying the use of the magnetic stripes 96 and 97 with which the indicia is associated. As is seen in FIG. 19, the indicia 98 and 99 are inverted with respect to one another, as are the account numbers 93 and 94.

In each of the transaction cards 60, 70, 80, 90 and 90', the rear faces thereof 65, 75, 85, 95 and 95' is preferably divided into areas A and B. As is indicated by the different shading on each rear face, the area A preferably has a different color from the area B so as to visually distinguish the area A from the area B. Accordingly, the identity of the magnetic stripe being swiped and read is readily apparent to the user or handler of the card at the point of sale.

Figure 20:
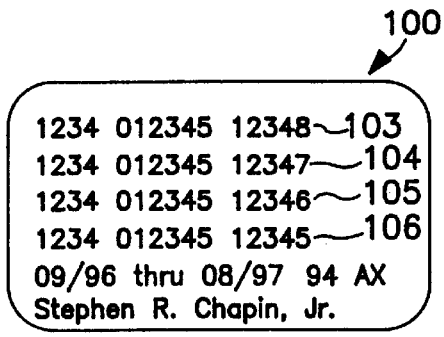
FIG. 20 is a front view of a seventh embodiment of a transaction card configured in accordance with the principles of the present invention.

Referring now to FIG. 20, there is shown a seventh embodiment of the invention, wherein transaction card 100 has in the front face 101 with transaction card customer information 102 identifying a single customer. Four account numbers 103, 104, 105 and 106 appear on the front face 101 of the transaction card 100.

Figure 21:
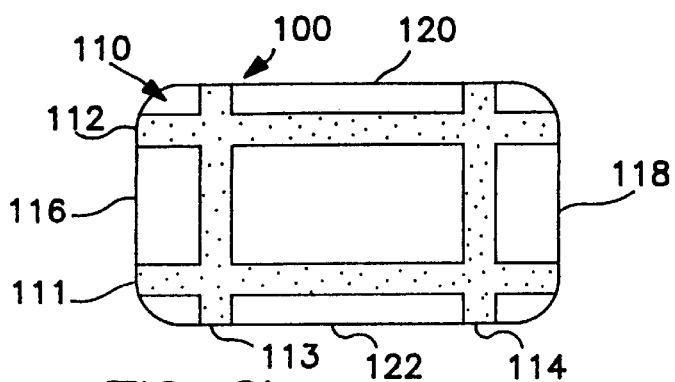
FIG. 21 is a rear view of the transaction card of FIG. 20.

Referring now to FIG. 21 wherein the rear face 110 of the transaction card 101 is shown, it is seen that there are four magnetic stripes 111, 112, 113 and 114 which corresponds to the account numbers 103, 104, 105 and 106, respectively. The stripes 111–114 can be identified using different colors, category identifiers (personal, business) and account numbers as mentioned previously for the two stripes. The magnetic stripes 113 and 114 are spaced from the short edges 116 and 118 of the transaction card 100 by the same distance that the magnetic stripes 111 and 112 are spaced from the long edges 120 and 122 of the transaction card. Consequently, the stripes 113 and 114 are readable by a standard magnetic card reader since even their shorter length is long enough to provide space for a usable code.

Figure 22:
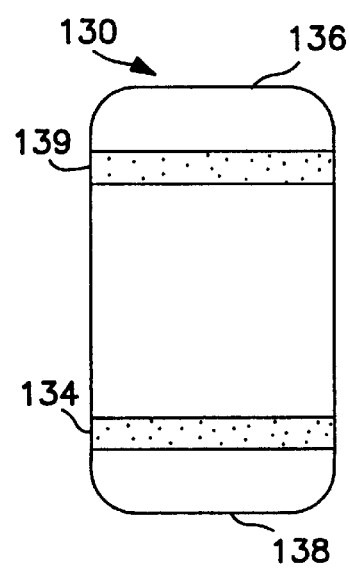
FIG. 22 is a planar, rear view of an embodiment of a transaction card which may be utilized with transaction cards having a front view which corresponds to FIGS. 10, 12, 14, 16 and 18.

Referring now to FIG. 22, a ninth embodiment of the invention is shown, wherein a credit card 130 has stripes 132 and 134 thereon which extend across the width of the card adjacent side edges 136 and 138. Again, the magnetic stripe 132 and 134 are long enough to contain enough information for reading by a conventional, standard transaction card reader.

Figure 23:
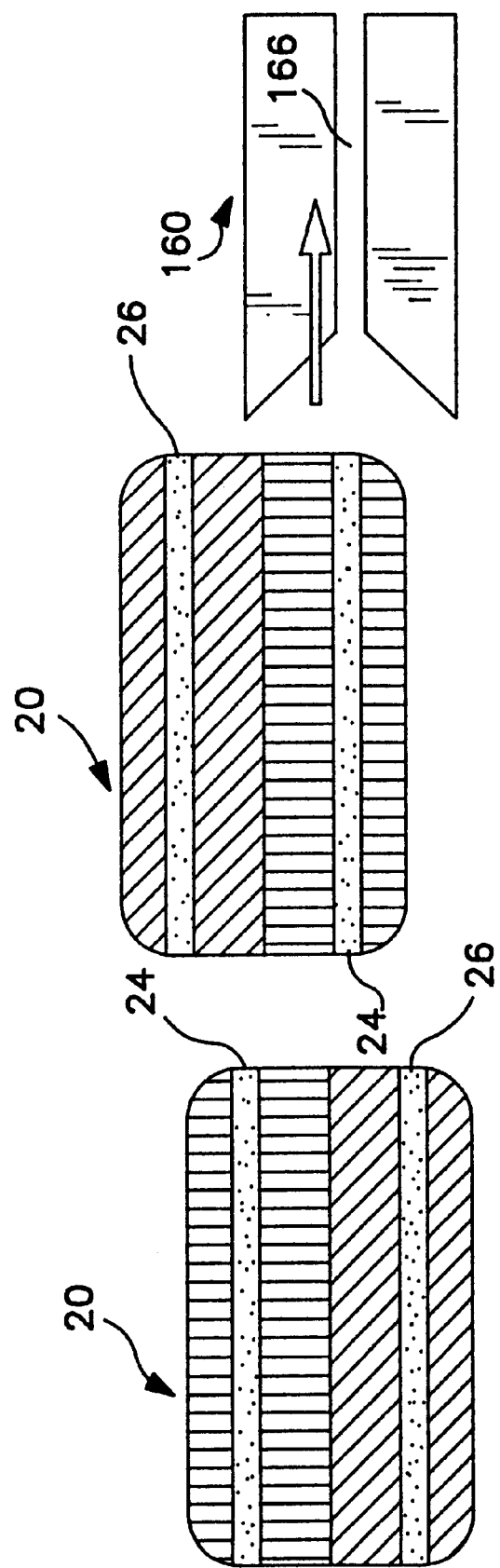
FIG. 23 is a diagrammatical view illustrating either of the embodiments of the transaction card of FIGS. 1–9 being used with a merchant swipe reader.
Figure 24:
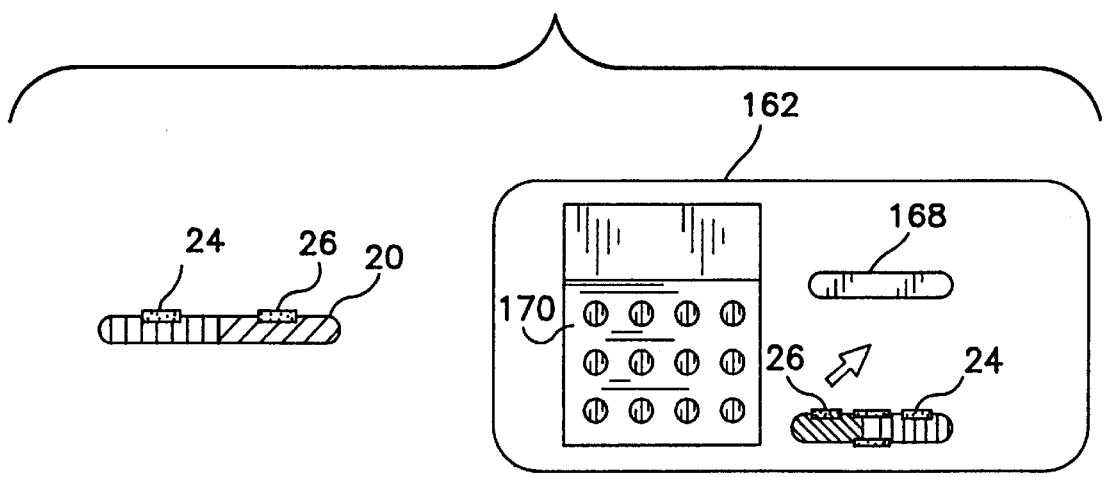
FIG. 24 is a diagrammatical view showing either of the embodiments of the transaction cards of FIGS. 1–9 being used with an ATM-like reader.
Figure 25:
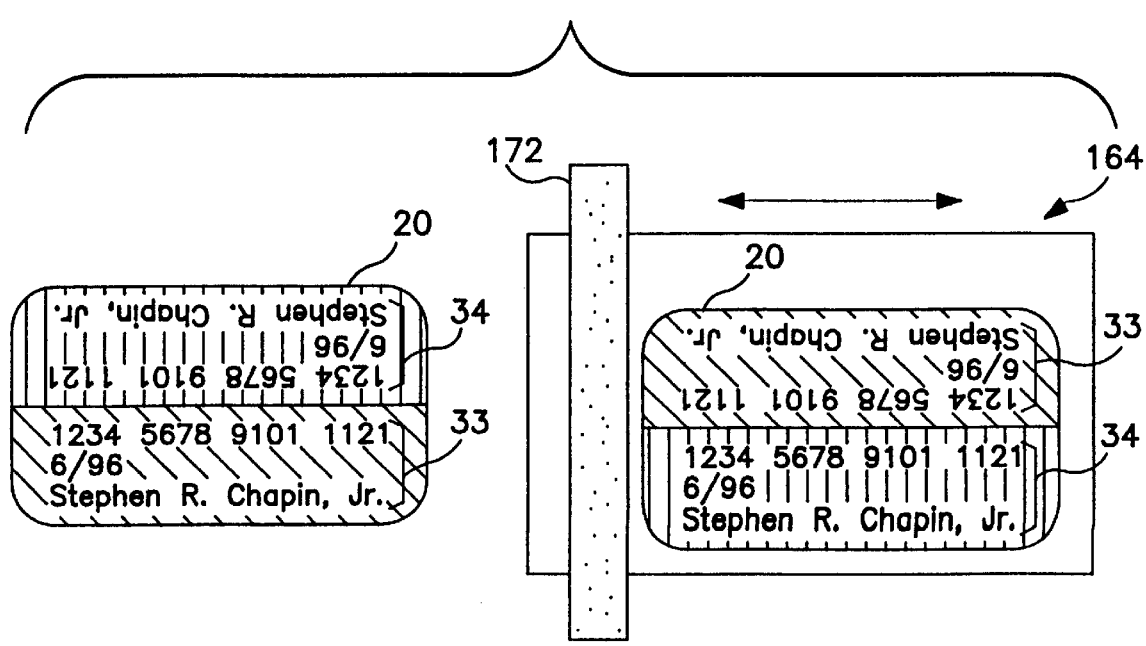
FIG. 25 is a diagrammatical view showing either of the embodiments of the transaction cards of FIGS. 1–9 being used with an impact-type reader.

Referring now to FIGS. 23–25, there are shown a standard variety of readers for the transaction card embodiments previously described. The readers are conventional readers employed presently at retail establishments and banks. In FIG. 23, a merchant swipe reader 160 is shown; in FIG. 24, an ATM-type reader 162 is shown; and in FIG. 25, an imprint-type reader 164 is shown. In each case, only the transaction card 20 of the first embodiment is shown being used but each of the aforedescribed transaction cards 40, 60, 70, 80, 90, 90' and 100 is also readably usable instead of the transaction card 20, the transaction card 20 being merely exemplary. With the merchant swipe reader 160, the card 20 is oriented so that either the first magnetic stripe 24 or the second magnetic stripe 26 is received in a slot 166, while in the ATM reader 162, either the first or second magnetic stripe is positioned for reading in a slot 168 in coordination with operation of a keypad 170. With the imprint-type reader 164, a slider 172 engages either the printed indicia 33 or the printed indicia 34 and imprints the indicia on a written charge slip. For use with imprint-type readers, the printed indicia 33 and 34 and the printed indicia of all embodiments is preferably raised but for other uses, the indicia need not be raised and, in accordance with another embodiment of the invention, is flat or coplanar with the surface of the transaction card.

Figure 26:
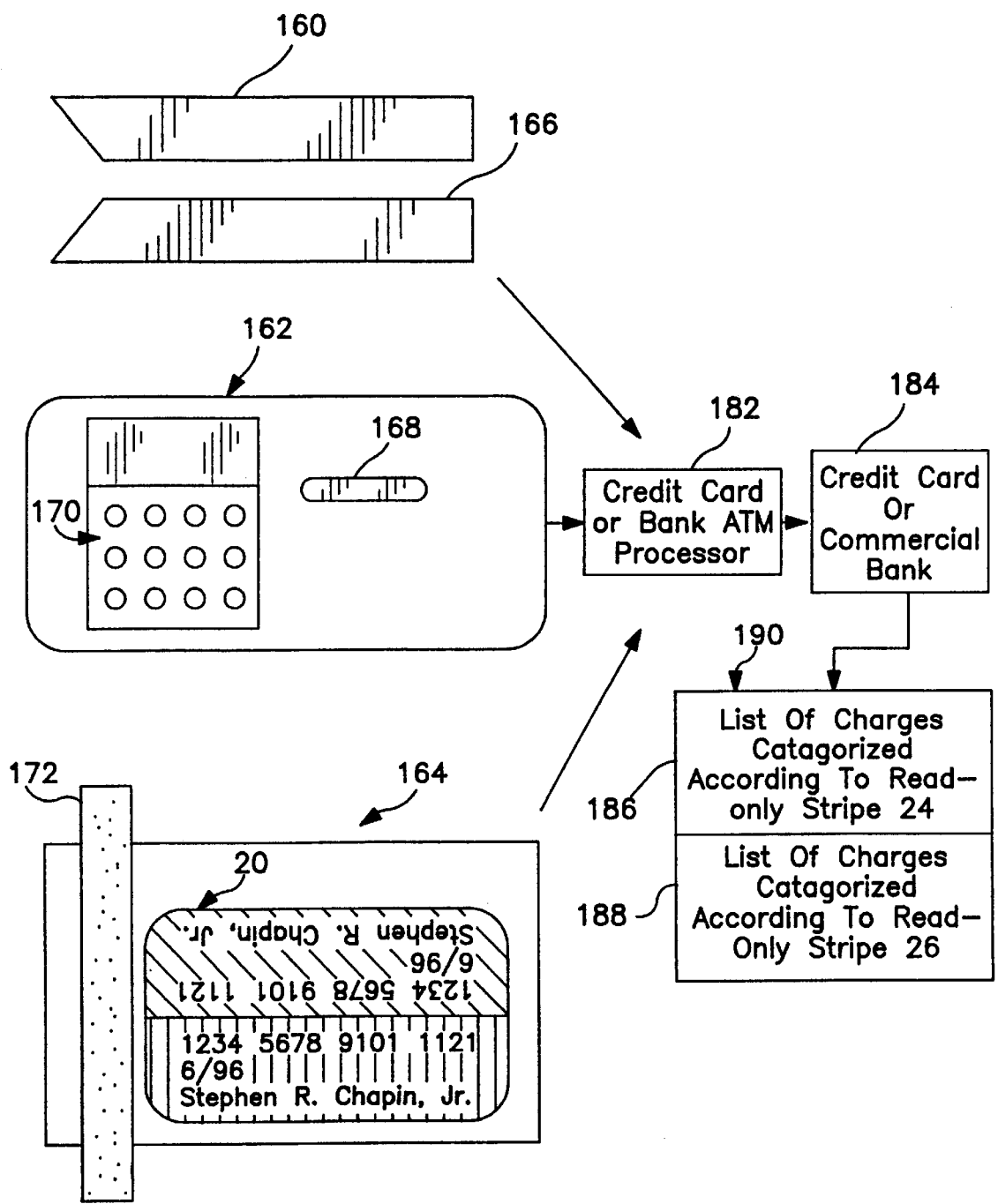
FIG. 26 is a diagrammatical view showing any of the readers of FIGS. 22–24, being connected with a currently existing transaction card processing system.

Referring now to FIG. 26 where a system for processing each of the transaction card embodiments is shown, a multiplicity of merchant swipe readers 160, ATM-type readers 162 and imprint readers 164 are connected to a credit card processor or bank ATM processor 182 in accordance with conventional currently used arrangements. The system is described during using the transaction card 20 of the first embodiment but each of the aforedescribed transaction cards is usable in the system. The processor 182 in turn communicates with a credit card bank or commercial bank 184 which generates two listings 186 and 188 on the card user's statement 190. The listing 186 is for charges to the account identified by data encrypted on the first magnetic stripe 24 and identified by the first area 21 on the back of the transaction card 20 and the third area 32 on the front of the transaction card 20, while the listing 188 corresponds to the data encrypted on the second magnetic stripe 26 in the second area 22 on the back surface 28 of the transaction card and the fourth area 30 on the front surface 29 of the transaction card. Likewise, when the second embodiment of the transaction card 40 is used, the listing 186 includes charges associated with the first magnetic stripe 42 on the first side 44 and the printed indicia 50 on the second side 44 of the transaction card while the listing 188 includes charges associated with the second magnetic stripe 46 on the second side 48 of the transaction card and the raised indicia 51 on the first side 44. In this way, the listings 186 and 188 are produced in the single statement 190, which single statement may be divided by the credit card user at the credit card user's convenience.

In accordance with another embodiment of the invention, if one of the stripes 24 or 26 is for ATM data, then the information relating to ATM transactions may appear on a separate statement. There may be other arrangements in which separate statements are preferred.

By configuring transaction cards with two magnetic data stripes or four magnetic data stripes (FIG. 21), numerous advantages result from the credit card user having the ability to separate transactions at the point of sale while maintaining one card. One card provides the physical convenience of carrying fewer cards while allowing the user such conveniences as consolidating rebates from multiple accounts such as air miles, etc. and receiving a single consolidated bill for which a single check may be written for payment. Additionally, one card deepens the relationship with a single company offering greater simplicity when resolving merchant disputes and replacing lost or stolen cards and enabling the user to garner higher credit lines as the credit card company has a deeper understanding of a user's total credit activity.

Reasons for separating transactions may be of special significance for small business owners who need specific categorization of business expenses which can be separated for accounting purposes. Employees can use the single transaction cards to separate business expenses that will require reimbursement from personal expenses. For budgeting purposes, items which need to be tracked separately can be charged against separate magnetic stripes while separate magnetic stripes allow staging of payments for cash flow because payment periods can be staggered, allowing more frequent smaller payments, rather than a single large payment. Another advantage is the ability to assign specific types of payment to specific lines of credit (charge lines: paid off monthly lines; revolving lines; lines requiring differing minimum payments; and installment lines requiring fixed payments). For example, charging emergency uses, such as health care expenses, to one of the magnetic stripes and personal uses to the other magnetic stripe. The present invention also enables the user to determine who pays for transactions made against each stripe. For example, college students may charge school supplies to be paid by parents to one stripe and all other expenses to be paid personally by the student to the other stripe. These are merely exemplary of advantages that the credit card, according to the present invention, provides to the credit card user.

With respect to credit card banks, credit card banks which distribute transaction cards configured with multiple magnetic stripes, according to the present invention, have the advantage of garnering additional market share in a highly competitive industry by replacing at least one other transaction card in the user's array to thereby become a card of choice, in essence doubling balance user's card. In addition, business/personal card synergies are achievable, benefitting both users and credit card banks. For example, a strong corporate card can add all of its business customers to its personal card portfolio by providing a combination business/personal card (and vice-versa). Such an advantage is even more compelling when card rebates, such as airline miles, are consolidated for both accounts on a card.

Deployment of credit cards configured in accordance with the present invention, such as the credit cards 20 and 40, is relatively easy to implement because the cards themselves are relatively inexpensive to produce since it is less expensive to manufacture single credit cards with dual stripes than to manufacture two separate one-stripe cards. Moreover, only minor, if any, revisions are necessary to current VISA/MasterCard regulations. In addition, the current installed base of credit card merchant reader equipment, including both magnetic stripe and raised letter technology can continue to be used with minimal, if any, retraining of merchants. Since the transaction cards of the present invention use current transaction and processing systems, there exists a track record of resistance to fraud, which any system requiring revision of the currently installed processing systems would require years to achieve.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An indivisible transaction card comprising:
a standard size and configuration conforming to regulations for a standard transaction card wherein the transaction card is an indivisible card readable by standard transaction card readers and includes a front face and a rear face;
the front face having printed indicia thereon identifying the customer; and
the rear face having a first magnetic stripe and a second magnetic stripe with both magnetic stripes being read-only magnetic stripes and being disposed adjacent opposite edges of the transaction card.

2. The transaction card of claim 1, wherein the transaction card has long edges and short edges and wherein the magnetic stripes extend parallel to the long edges.

3. The transaction card of claim 2, wherein the first magnetic stripe is in a first area of a first color and the second stripe is in a second area of a second color different from the first color.

4. The transaction card of claim 3, wherein the transaction card has long edges and short edges and wherein the magnetic stripes extend parallel with the short edges.

5. An indivisible transaction card comprising:
a standard size and configuration conforming to regulations for a standard transaction card wherein the transaction card is an indivisible card readable by standard transaction card readers and includes a front face and a rear face;
the front face having printed indicia thereon identifying the customer and numerical indicia identifying the account number of the customer, the account number having a selectable final digit to provide first and second permutations of the account number; and
rear face having a first magnetic stripe associated with the first permutation and a second magnetic stripe associated with the second permutation, the magnetic stripes being read-only magnetic stripes and being disposed adjacent to opposite edges of the transaction card.

6. The transaction card of claim 5, wherein the transaction card has long edges and short edges and wherein the magnetic stripes extend parallel to the long edges.

7. The transaction card of claim 6, wherein the first magnetic stripe is in a first area of a first color and the second stripe is in a second area of a second color different from the first color.

8. The transaction card of claim 6 further including additional printed indicia disposed adjacent each magnetic stripe identifying the purpose of the account and account number associated with the magnetic stripe.

9. The transaction card of claim 5, wherein the transaction card has long edges and short edges and wherein the magnetic stripes extend parallel with the short edges.

10. An indivisible transaction card comprising:
a standard size and configuration conforming to VISA/MasterCard/American Express/Discover regulations for the transaction card wherein the transaction card is an indivisible card readable by standard transaction card readers and includes a front face and a rear face;
the front face having printed indicia thereon identifying the customer and numerical indicia identifying first and second account numbers identified with the customer; and
the rear face having a first magnetic stripe associated with the first account number and a second magnetic stripe associated with the second account number, the magnetic stripes being read-only magnetic stripes and being disposed opposite edges of the transaction card.

11. The transaction card of claim 10, wherein the transaction card has long edges and short edges and wherein the magnetic stripes extend parallel to the long edges.

12. The transaction card of claim 11, wherein the first magnetic stripe is in a first area of a first color and the second stripe is in a second area of a second color different from the first color.

13. The transaction card of claim 12 further including additional printed indicia disposed adjacent each magnetic stripe identifying the purpose of the account and account number associated with the magnetic stripe.

14. The transaction card of claim 12 further including additional printed indicia disposed adjacent each account number identifying the purpose of the account associated with the account number.

15. The transaction card of claim 12, wherein the second account number is inverted with respect to the first account number.

16. The transaction card of claim 12, wherein the second account number is oriented the same as the first account number.

17. The transaction card of claim 10, wherein the transaction card has long edges and short edges and wherein the magnetic stripes extend parallel with the short edges.

18. The transaction card of claim 10, wherein the second account number is inverted with respect to the first account number.

19. The transaction card of claim 10, wherein the second account number is oriented the same as the first account number.

20. The transaction card of claim 10 further including additional printed indicia disposed adjacent each account number identifying the purpose of the account associated with the account number.

21. An indivisible transaction card comprising:
a standard size and configuration conforming to regulations for a standard transaction card wherein the transaction card is an indivisible card readable by standard transaction card readers and includes a first face and a second face;
the first face being divided into only a first area and a second area;
the second face being divided into only a third area and a fourth area;
first indicia identifying an authorized user and/or account number of the transaction card, the first indicia occupying only one of the areas;
second indicia identifying the authorized user and/or account number of the transaction card, the second indicia occupying one of the areas;
a first read-only magnetic stripe associated with the first indicia and a first account, the first magnetic stripe occupying only an area not occupied by either indicia; and
a second read-only magnetic stripe associated with the second indicia and a second account, the second magnetic stripe occupying only an area not occupied by either the first or second indicia or the first magnetic stripe, whereby the indivisible transaction card accesses two accounts associated with the same authorized user via a standard transaction card reader.

22. The indivisible transaction card of claim 21, wherein the first and second indicia are in the first and second areas on the first face and the first and second magnetic stripes are in the third and fourth areas on the second face.

23. The indivisible transaction card of claim 22, wherein the areas containing the first indicia and first magnetic stripe are of a first color and the areas containing the second indicia and second magnetic stripe are of a second color.

24. The transaction card of claim 21 further including additional printed indicia disposed adjacent each magnetic stripe identifying the purpose of the account and account number associated with the stripe.

25. The indivisible transaction card of claim 21, wherein the first indicia is inverted with respect to the second indicia and wherein the first stripe relating to the first indicia is disposed in an area facing opposite the area of the second indicia and the second stripe relating to the second indicia is disposed in an area facing opposite the area of the first indicia, whereby when the transaction card is in a first orientation, the first indicia is uninverted and the first magnetic stripe is read and when the card is in a second orientation, opposite the first orientation, the second indicia is uninverted and the second magnetic stripe is read.

26. The indivisible transaction card of claim 25, wherein other than being inverted, with respect to one another, the first and second indicia are identical.

27. The indivisible transaction card of claim 26, wherein the areas containing the first indicia and first magnetic stripe are of a first color and the areas containing the second indicia and second magnetic stripe are of a second color.

28. The indivisible transaction card of claim 25, wherein the areas containing the first indicia and first magnetic stripe are of one color and the areas containing the second indicia and second magnetic stripe are of another color.

29. The indivisible transaction card of claim 21, wherein the first and second indicia are on opposite sides of the card and the first and second magnetic stripes are on opposite sides of the card.

30. The indivisible transaction card of claim 29, wherein first indicia is on an area facing opposite the area occupied by the second magnetic stripe and the second indicia is in an area facing opposite the area occupied by the first magnetic stripe.

31. The indivisible transaction card of claim 30, wherein the areas containing the first indicia and first magnetic stripe are of one color and the areas containing the second indicia and second magnetic stripe are of another color.

32. The indivisible transaction card of claim 30, wherein the areas containing the first indicia and first magnetic stripe are of a first color and the areas containing the second indicia and second magnetic stripe are of a second color.

33. The indivisible transaction card of claim 29, wherein the areas containing the first indicia and first magnetic stripe are of a first color and the areas containing the second indicia and second magnetic stripe are of a second color.

34. The indivisible transaction card of claim 21, wherein the areas containing the first indicia and first magnetic stripe are of a first color and the areas containing the second indicia and second magnetic stripe are of a second color.

35. A system including standard retail transaction card readers with central information processors being connected thereto and a plurality of indivisible transaction cards readable by the standard retail transaction card readers, the system comprising:

each indivisible transaction card having a first face and a second face and each indivisible transaction card being of standard size and configuration conforming to regulations for a standard transaction cards, wherein the transaction card is readable in an indivisible state by the standard transaction card readers;

each first face being divided into a first area and a second area;

each second face being divided into a third area and a fourth area;

first indicia identifying an authorized user and/or account number of the transaction card, the first indicia occupying only one of the areas;

second indicia identifying the authorized user and/or account number of the transaction card, the second indicia occupying one of the areas;

a first read-only magnetic stripe associated with the first indicia and a first account, the first magnetic stripe occupying only one area not occupied by either indicia;

a second read-only magnetic stripe associated with the second indicia and a second account, the second magnetic stripe occupying only an area not occupied by either the first and second indicia or the first magnetic stripe, whereby the indivisible transaction card accesses two accounts associated with the same authorized user;

the standard retail transaction card readers or ATM bank card readers being connected to an invoice generating processor; and statements being generated by the invoice generating processor for each card, the statements having information corresponding to the first read-only data stripe and information corresponding with the second read-only data stripe.

36. The system of claim 35, wherein the first and second indicia are in the first and second areas on the first face and the first and second magnetic stripes are in the third and fourth areas on the second face.

37. The system of claim 36, wherein the areas containing the first indicia and first magnetic stripe are of one color and the areas containing the second indicia and second, magnetic stripe are of another color.

38. The system of claim 36, wherein the areas containing the first indicia and first magnetic stripe are of one color and the areas containing the second indicia and second magnetic stripe are of another color.

39. The system of claim 35, wherein the first indicia is inverted with respect to the second indicia and wherein the first stripe relating to the first indicia is disposed in an area facing opposite the area of the second indicia and the second stripe relating to the second indicia is disposed in an area facing opposite the area of the first indicia whereby when the transaction card is in a first orientation, the first indicia is uninverted and the first magnetic stripe is read and when the card is in a second orientation, opposite the first orientation, the second indicia is uninverted and the second magnetic stripe is read.

40. The system of claim 39, wherein other than being inverted with respect to one another, the first and second indicia are identical.

41. The system of claim 40, wherein the areas containing the first indicia and first magnetic stripe are of one color and the areas containing the second indicia and second magnetic stripe are of another color.

42. The system of claim 35, wherein the first and second indicia are on opposite sides of the card and the first and second magnetic stripes are on opposite sides of the card.

43. The system of claim 42, wherein first indicia is on an area facing opposite the area occupied by the second magnetic stripe and the second indicia is in an area facing opposite the area occupied by the first magnetic stripe.

44. The system of claim 43, wherein the areas containing the first indicia and first magnetic stripe are of one color and the areas containing the second indicia and second magnetic stripe are of another color.

45. The system of claim 42, wherein the areas containing the first indicia and first magnetic stripe are of one color and the areas containing the second indicia and second magnetic stripe are of another color.

46. The system of claim 35, wherein the areas containing the first indicia and first magnetic stripe are of one color and the areas containing the second indicia and second magnetic stripe are of another color.

47. The system of claim 35 further including additional printed indicia disposed adjacent teach magnetic stripe identifying the purpose of the account and account number associated with the magnetic stripe.

48. A system including standard retail transaction card readers with central information processors being connected thereto and a plurality of indivisible transaction cards readable by the standard retail transaction card readers, the system comprising:

each indivisible transaction card having a front face and a rear face and each indivisible transaction card being of standard size and configuration conforming to regulations for a standard transaction cards, wherein the transaction card is readable in an indivisible state by the standard transaction card readers;

the front face having printed indicia thereon identifying the customer;

the rear face having a first magnetic stripe and a second magnetic stripe with both magnetic stripes being read-only magnetic stripes and being disposed adjacent opposite edges of the transaction card;

the standard retail transaction card readers or ATM bank card readers being connected to an invoice generating processor; and statements being generated by the invoice generating processor for each card, the statements having information corresponding to the first read-only data stripe and information corresponding with the second read-only data stripe.

49. A system including standard retail transaction card readers with central information processors being connected thereto and a plurality of indivisible transaction cards readable by the standard retail transaction card readers, the system comprising:

each indivisible transaction card having a front face and a rear face and each indivisible transaction card being of standard size and configuration conforming to regulations for a standard transaction cards, wherein the transaction card is readable in an indivisible state by the standard transaction card readers;

the front face having printed indicia thereon identifying the customer and numerical indicia identifying the account number of the customer, the account number having a selectable final digit to provide first and second permutations of the account number;

a rear face having a first magnetic stripe associated with the first permutation and a second magnetic stripe associated with the second permutation, the magnetic stripes being read-only magnetic stripes and being disposed adjacent to opposite edges of the transaction card;

the standard retail transaction card readers or ATM bank card readers being connected to an invoice generating processor; and statements being generated by the invoice generating processor for each card, the statements having information corresponding to the first read-only data stripe and information corresponding with the second read-only data stripe.

50. A system including standard retail transaction card readers with central information processors being connected thereto and a plurality of indivisible transaction cards readable by the standard retail transaction card readers, the system comprising:

each indivisible transaction card having a front face and a rear face and each indivisible transaction card being of standard size and configuration conforming to regulations for a standard transaction cards, wherein the transaction card is readable in an indivisible state by the standard transaction card readers;

the front face having printed indicia thereon identifying the customer and numerical indicia identifying first and second account numbers identified with the customer;

the rear face having a first magnetic stripe associated with the first account number and a second magnetic stripe associated with the second account number, the magnetic stripes being read-only magnetic stripes and being disposed adjacent to opposite edges of the transaction card;

the standard retail transaction card readers or ATM bank card readers being connected to an invoice generating processor; and statements being generated by the invoice generating processor for each card, the statements having information corresponding to the first read-only data stripe and information corresponding with the second read-only data stripe.

51. The system of claim 50, wherein, on the transaction card, the second account number is inverted with respect to the first account number.

52. The system of claim 50, wherein, on the transaction card, the second account number is oriented the same as the first account number.

53. The system of claim 50, the transaction card further including additional printed indicia disposed adjacent to each account number identifying the purpose of the account associated with the account number.

54. An indivisible transaction card comprising:

a standard size and configuration conforming to regulations for a standard transaction card wherein the transaction card is an indivisible card readable by standard transaction card readers and includes a front face and a rear face;

the front face having printed indicia thereon identifying the customer and numerical indicia identifying more than two account numbers of the customer; and the rear face having separate magnetic stripes associated with each account number, the magnetic stripes being read-only magnetic stripes disposed adjacent and extending parallel to edges of the transaction card.

55. The transaction card of claim 54, wherein there are four magnetic stripes with two magnetic stripes extending adjacent to and parallel with long edges of the transaction card and two magnetic stripes extending adjacent to and parallel with short edges of the transaction card.

56. A system including standard retail transaction card readers with central information processors being connected thereto and a plurality of indivisible transaction cards readable by the standard retail transaction card readers, the system comprising:

each indivisible transaction card having a front face and a rear face and each indivisible transaction card being of standard size and configuration conforming to regulations for a standard transaction cards, wherein the transaction card is readable in an indivisible state by the standard transaction card readers;

the front face having printed indicia thereon identifying the customer and numerical indicia identifying more than two account numbers of the customer;

the rear face having separate magnetic stripes associated with each account number, the magnetic stripes being read-only magnetic stripes disposed adjacent and extending parallel to edges of the standard retail transaction card readers of ATM bank card readers being connected to an invoice generating processor; and statements being generated by the invoice generating processor for each card, the statements having information corresponding to a first read-only data stripe and information corresponding with a second read-only data stripe; information corresponding to the third read-only data stripe, and information corresponding to the fourth read-only data stripe.

57. The system of claim 56, wherein there are four magnetic stripes on each transaction card with the first and second magnetic stripes extending adjacent to and parallel with the long edges of the transaction card and the third and fourth magnetic stripes extending adjacent to and parallel with the short edges of the transaction card.

* * * * *